(12) United States Patent
Grantz et al.

(10) Patent No.: US 8,033,731 B2
(45) Date of Patent: Oct. 11, 2011

(54) FLUID DYNAMIC BEARING MOTOR HAVING MOLDED PLASTIC

(75) Inventors: Alan L. Grantz, Aptos, CA (US); Klaus D. Kloeppel, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 748 days.

(21) Appl. No.: 11/975,046

(22) Filed: Oct. 17, 2007

(65) Prior Publication Data

US 2009/0103839 A1    Apr. 23, 2009

(51) Int. Cl.
*F16C 32/06* (2006.01)

(52) U.S. Cl. .................. 384/100; 384/107; 384/110

(58) Field of Classification Search .................. 384/100, 384/107–124; 360/99.08, 98.07; 310/90
See application file for complete search history.

(56) References Cited

U.S. PATENT DOCUMENTS

| | | | |
|---|---|---|---|
| 5,363,003 A * | 11/1994 | Harada et al. | 310/67 R |
| RE38,178 E * | 7/2003 | Elsasser et al. | 360/98.07 |
| 6,756,715 B2 * | 6/2004 | Hirose et al. | 310/90 |
| 6,898,050 B2 * | 5/2005 | Gredinberg et al. | 360/98.08 |
| 2002/0018603 A1 * | 2/2002 | Narita | 384/100 |
| 2004/0005101 A1 * | 1/2004 | Grantz | 384/110 |

* cited by examiner

*Primary Examiner* — Thomas R Hannon (57) ABSTRACT

A fluid dynamic bearing motor and method are described, wherein motor components, including complex shaped motor components, are molded of plastic. The molding ensures form control and dimensional control thereby accomplishing design requirements, and eliminating or reducing component costs and component machining. The mold can be shaped to form various motor geometries, thereby eliminating the need for multiple component assembly and related assembly costs. In an aspect, a plastic integral motor hub is formed by injection molding. Alternatively, a plastic motor hub is affixed to a metal sleeve. In another aspect, fluid containment structures are molded into the motor component, reducing the number of components as compared with machined metal components. In a further aspect, bearing structures such as grooves are molded into the motor component, thereby eliminating processes such as electrochemical machining. In yet a further aspect, a plastic hub faces a thrustplate, reducing expensive sleeve machining.

25 Claims, 8 Drawing Sheets

FLUID DYNAMIC BEARING MOTOR HAVING MOLDED PLASTIC

BACKGROUND

Disc drive memory systems store digital information that is recorded on concentric tracks of a magnetic disc medium. At least one disc is rotatably mounted on a spindle, and the information, which can be stored in the form of magnetic transitions within the discs, is accessed using read/write heads or transducers. A drive controller is conventionally used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor has a spindle mounted by means of a bearing system to a motor shaft disposed in the center of the hub. The bearings permit rotational movement between the shaft and the sleeve, while maintaining alignment of the spindle to the shaft. The read/write heads must be accurately aligned with the storage tracks on the disc to ensure the proper reading and writing of information.

These disc drive memory systems are being utilized in progressively more environments besides traditional stationary computing environments. Recently, disc drive memory systems are incorporated into devices that are operated in mobile environments including digital cameras, digital video cameras, GPS devices, video game consoles and personal music players, in addition to portable computers. As such, performance and design needs have intensified including improved resistance to shock, improved robustness and reduced power consumption. Further, a demand exists for increased storage capacity and smaller disc drives, which has led to the design of higher recording areal density such that the read/write heads are placed increasingly closer to the disc surface. Because rotational accuracy is critical, disc drives currently utilize a spindle motor having fluid dynamic bearings (FDB) between a shaft and sleeve to support a hub and the disc for rotation. In a hydrodynamic bearing, a lubricating fluid provides a bearing surface between a fixed member and a rotating member of the disc drive. Hydrodynamic bearings, however, suffer from sensitivity to external loads or mechanical shock, which can jar fluid from the bearing. Fluid containment is critical to the life of a motor, and designs have tended to increase component complexity.

Presently, motor component design complexity requires many machining operations, which increases the costs of components. The basic component geometry of a motor component may require removal of a substantial amount of metal, depending on the form factor, and therefore the machining costs are significant in relation to the overall finished motor cost. Multiple components must be precisely assembled in order to achieve a motor construction that is able to perform with or as a fluid bearing, and that allows appropriate fluid containment. Electrochemical machining (ECM) processes typically incorporate bearing structures (i.e., grooves and lands) into metal parts. However, to utilize ECM, metal parts and accurate process interface surfaces are required. Metal parts may also require additional coating (i.e., DLC) to ensure appropriate wear performance.

SUMMARY

The present invention provides a molded plastic component for fluid dynamic bearing (FDB) motors. The FDB motor includes a fluid dynamic bearing containing fluid defined between an inner component and an outer component, wherein the inner component and the outer component are positioned for relative rotation. At least a portion of the outer component is plastic formed by a molding process. The outer component has a plastic surface that faces and defines a fluid bearing with the inner component. Alternatively, the outer component is affixed to a metal component, wherein the metal component has a metal surface that faces and defines a fluid bearing with the inner component. These and various other features and advantages will be apparent from a reading of the following detailed description.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

As described herein, the present invention provides a molded plastic component for fluid dynamic bearing (FDB) motors, including conical, spherical or hemispherical motor designs. Motor components, including complex shaped motor components, are molded of plastic. The molding ensures form control and dimensional control thereby accomplishing design requirements, and eliminating additional component costs, and eliminating or reducing component machining. In an embodiment, injection molding is employed to form a motor component, and the mold design is shaped to form various motor geometries, thereby eliminating the need for multiple component assembly and related assembly costs. In an embodiment, a plastic integral motor hub that faces and defines a bearing with a shaft is formed by injection molding. Alternatively, a plastic motor hub is affixed to a metal sleeve, wherein the metal sleeve defines a bearing with the shaft. In an embodiment, fluid containment structures and features are directly molded into the plastic motor component, thereby reducing the number of components as compared with machined metal components. Additionally, in an embodiment, bearing structures such as grooves and lands are molded into the plastic motor component, thereby eliminating processes such as electrochemical machining. Further, in an embodiment, a plastic hub is utilized to face a thrustplate, replacing a counterplate, and reducing expensive sleeve machining.

It will be apparent that features of the discussion and claims may be utilized with disc drives, low profile disc drive memory systems, spindle motors, various FDB design motors including hydrodynamic and hydrostatic motors, and other motors employing a stationary and a rotatable component, including motors employing conical bearings. Further, embodiments of the present invention may be employed with a fixed shaft or a rotating shaft. Also, as used herein, the terms "axially" or "axial direction" refers to a direction along a centerline axis length of the shaft (i.e., along axis 204 of shaft 212 shown in FIG. 2A), and "radially" or "radial direction" refers to a direction perpendicular to the centerline length of the shaft 212. Also, as used herein, the expressions indicating orientation such as "upper", "lower", "top", "bottom" and the like, are applied in a sense related to normal viewing of the figures rather than in any sense of orientation during particular operation, etc. These orientation labels are provided simply to facilitate and aid understanding of the figures and should not be construed as limiting.

Figure 1:
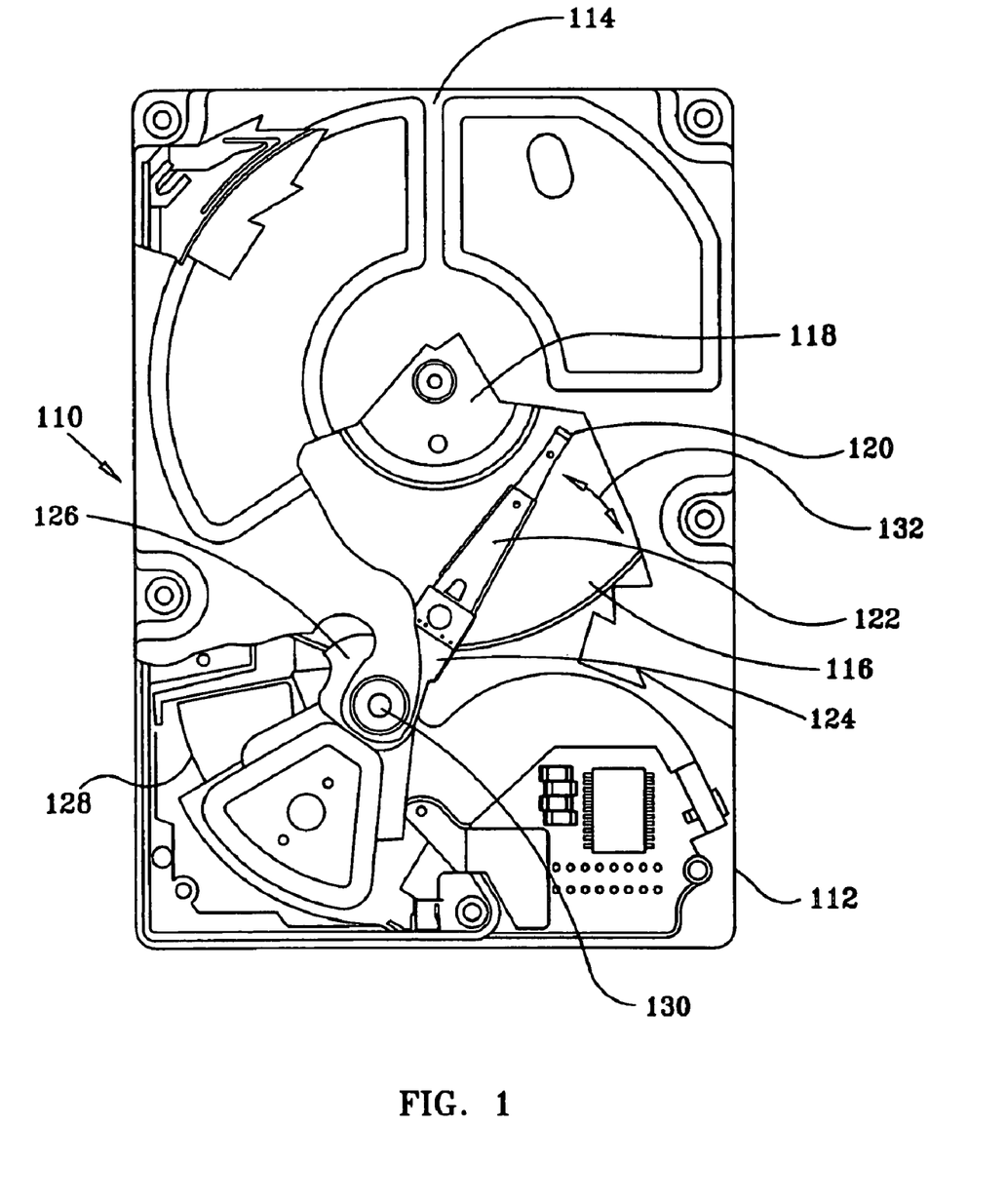
FIG. 1 is a top plan view of a disc drive data storage system in which the present invention is useful, in accordance with an embodiment of the present invention.

Referring to the drawings wherein identical reference numerals denote the same elements throughout the various views, FIG. 1 illustrates a top plan view of a disc drive data storage device 110 in which the present invention is useful. Clearly, features of the discussion and claims are not limited to this particular design, which is shown only for purposes of the example. Disc drive 110 includes housing base 112 that is combined with cover 114 forming a sealed environment to protect the internal components from contamination by elements outside the sealed environment. Disc drive 110 further includes disc pack 116, which is mounted for rotation on a motor (described in FIG. 2A) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Figure 2A:
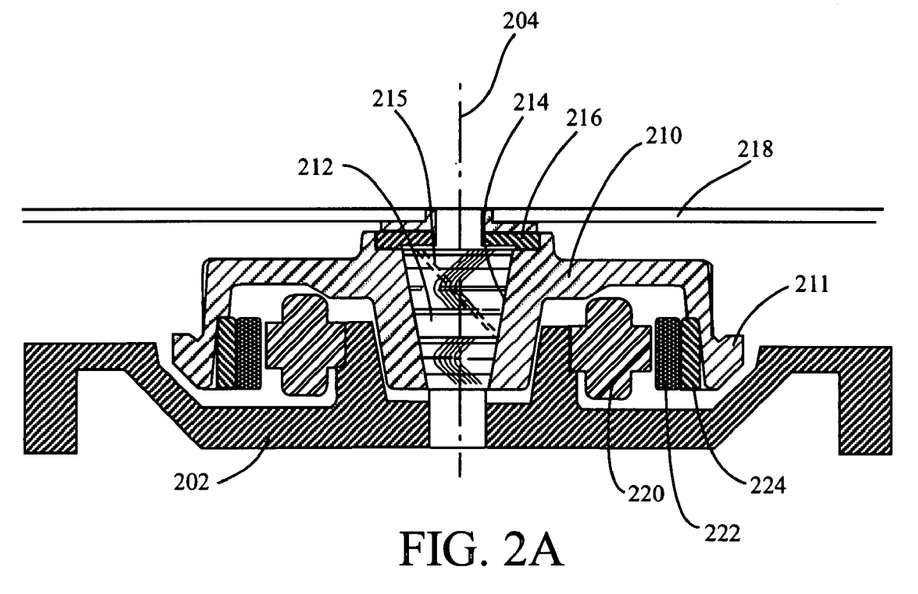
FIG. 2A is a sectional side view of a fluid dynamic bearing motor that can be used in a disc drive data storage system as in FIG. 1, wherein at least a portion of an outer component is plastic formed by a molding process, and wherein the outer component has a plastic surface that faces and defines a bearing with the inner component, in accordance with an embodiment of the present invention.

FIG. 2A is a sectional side view of a FDB motor that can be used in a disc drive data storage system 110, as in FIG. 1. The motor includes an inner component and an outer component, wherein the inner component and the outer component are positioned for relative rotation, and define a journal bearing 214 therebetween. In this example, the outer components (rotatable components) include hub 210 and hub portion 216, connected to magnet 222. Hub 210 also includes a disc carrier member 211, which supports disc pack 116 (shown in FIG. 1) for rotation about shaft 212. Hub 210 is affixed to backiron 224 and magnet 222. One or more magnets 222 are attached to a periphery of backiron 224. The magnets 222 interact with a stator winding 220 attached to the base 202 to cause the hub 210 to rotate. Magnet 222 can be formed as a unitary, annular ring or can be formed of a plurality of individual magnets that are spaced about the periphery of hub 210. Magnet 222 is magnetized to form one or more magnetic poles. The inner components (stationary components) include shaft 212, which is connected to stator 220 and base 202. Additionally, this design allows for and includes shaft 212 attached to top cover 218.

Illustrated as an example, at least a portion of an outer component (i.e., hub 210 and hub portion 216) is plastic formed by a molding process, wherein the hub 210 has a plastic surface that faces and defines journal bearing 214 with the inner component (i.e., shaft 212). Alternatively, hub 210 is attached to a metal sleeve and the sleeve has a metal surface that faces and defines journal bearing 214 with the inner component (as described in FIG. 8). In an embodiment, the plastic utilized is a liquid crystal polymer (LCP), having a carbon fiber filling for strength reinforcement, reduction of thermal expansion, and conductivity. In an embodiment, the material utilized for the mold has low shrinkage to ensure motor form control, and has a low moisture absorption rate. When a conical plastic hub is employed, and the inner diameter of the plastic hub expands, then the journal bearing gap can remain constant by the shaft repositioning lower within the journal bearing. Alternatively, when the inner diameter of the plastic hub contracts, then the journal bearing gap can remain constant by the shaft repositioning higher within the journal bearing.

The molding process used for forming the plastic hub is injection molding, although other molding processes may be alternatively employed. Further, in an embodiment, the plastic is injected using center gating to allow for uniform radial flow across the mold cavity. Here, the plastic includes the fibrous material (i.e., carbon fiber) that is injected into a mold center. The fibrous material therefore substantially aligns in a uniform direction. In an embodiment, the mold utilizes uniform heat distribution of less than 1.5 degrees Celsius surrounding the mold cavity.

Figure 10:
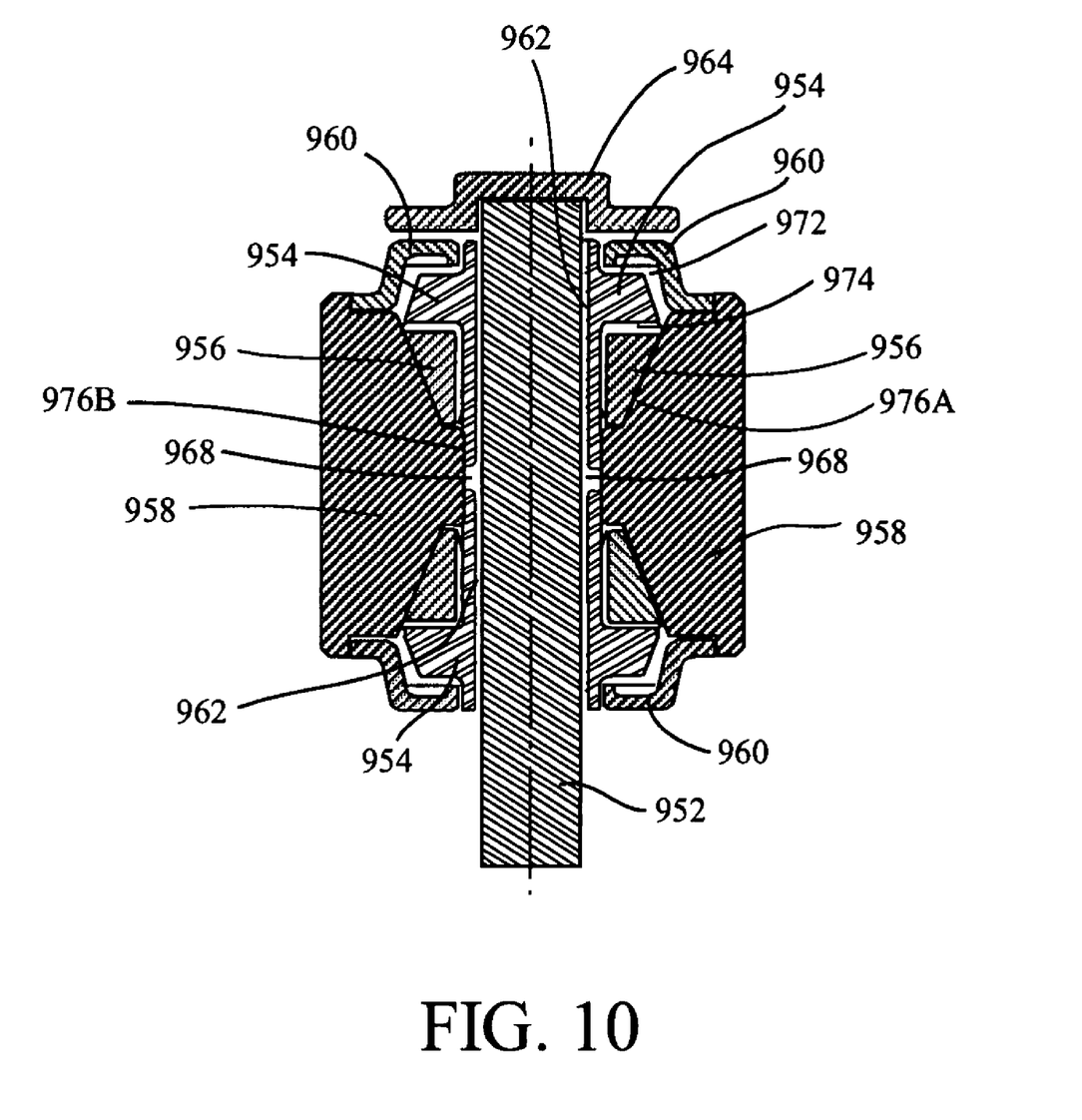
FIG. 10 is a sectional side view of a fluid dynamic bearing motor wherein a plastic outer component faces and defines a bearing with an inner component, wherein a plastic cone support is affixed to the inner component, and a plastic cone is affixed to the plastic cone support, wherein the plastic cone support and the plastic cone define a fluid passageway therebetween, in accordance with an embodiment of the present invention.

A fluid dynamic journal bearing 214 is established between the inside diameter of hub 210 and the shaft 212. A fluid, such as lubricating oil or a ferromagnetic fluid fills interfacial regions between shaft 212 and hub 210, as well as between particular other stationary and rotatable components. While the present figure is described herein with a lubricating fluid, those skilled in the art will appreciate that useable fluids include a lubricating liquid, lubricating gas, or a combination of a lubricating liquid and lubricating gas. Also, typically one of shaft 212 and hub 210 includes sections of pressure generating grooves, including asymmetric grooves and symmetric grooves. Asymmetric grooves and symmetric grooves may have a pattern including one of a herringbone pattern and a sinusoidal pattern inducing fluid flow in the interfacial region and generating a localized region of dynamic high pressure and radial stiffness. As hub 210 rotates, pressure is built up in each of its grooved regions and shaft 212 supports hub 210 for constant rotation. A fluid recirculation path 215 is formed through shaft 212. Fluid recirculation path 215 fluidly connects and recirculates fluid from journal bearing 214 to a reservoir between hub portion 216 and shaft 212, facilitating purging of air from journal bearing 214. The fluid recirculation path 215 is shown having about a 45 degree angle, although other angles and places of connection to journal bearing 214 may be employed. Alternatively, a plastic molded fluid recirculation path is formed through plastic hub 210 to pass and recirculate fluid through journal bearing 214, and also to facilitate purging air from journal bearing 214. A fluid recirculation passageway molded by plastic is shown in FIG. 10.

Figure 2B:
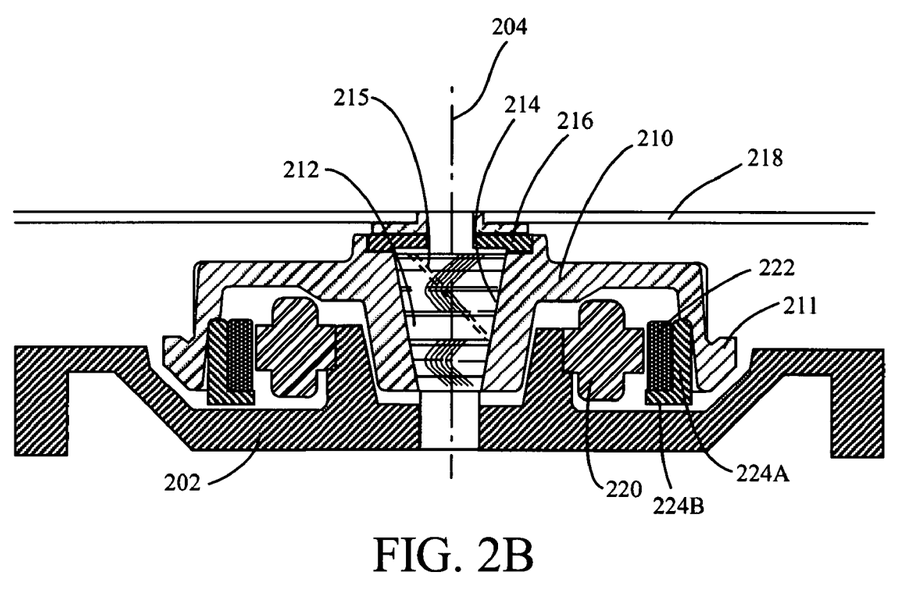
FIG. 2B is another sectional side view of a fluid dynamic bearing motor that can be used in a disc drive data storage system as in FIG. 1, wherein at least a portion of an outer component is formed of plastic by a molding process, and a backiron extends axially adjacent to a magnet and also radially adjacent to a bottom portion of the magnet, in accordance with an embodiment of the present invention.

Referring now to FIG. 2B, another sectional side view of a FDB motor is illustrated that can be used in a disc drive data storage system as in FIG. 1, wherein at least a portion of an outer component (i.e., hub 210) is formed of plastic by a molding process. The plastic outer component is attached to backiron portions 224A and 224B. The backiron portions 224A and 224B are inserted during the molding process of the plastic outer component. Alternatively, the backiron is bonded to the plastic outer component following the molding process. In an embodiment, the backiron portions 224A and 224B are a ferromagnetic material such as iron or steel. The backiron is affixed to magnet 222, wherein the backiron 224A extends axially adjacent to the magnet 222 (backiron portion 224A), and also radially adjacent to a bottom portion of the magnet (backiron portion 224B). By the backiron having this form, the magnetic bias force of magnet 222 with stator 220 is thus enhanced. That is, counterbalancing upward and downward forces are created in the FDB motor design. The upward force may be created by a thrustbearing between hub portion 216 and shaft 212. The downward force is created by the magnetic bias force of magnet 222 with stator 220. The backiron portion 224B shields the magnetic forces that may occur between magnet 222 and base 202, thereby balancing the magnetic bias force of magnet 222 with stator 220.

Figure 3:
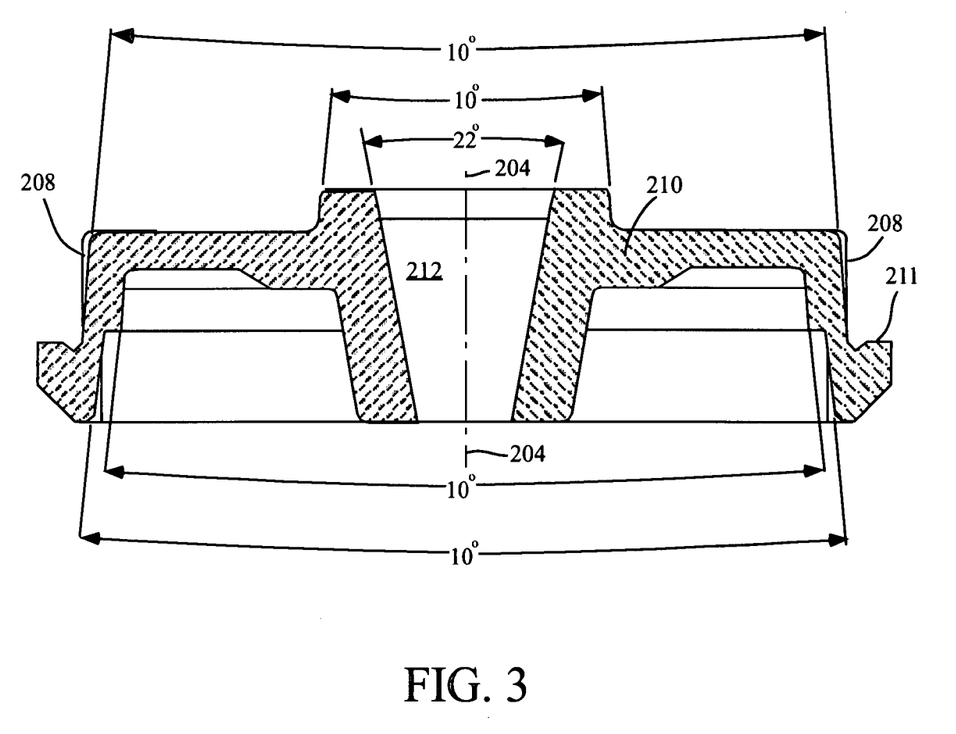
FIG. 3 is a sectional side view of the fluid dynamic bearing motor as in FIG. 2A, wherein draft is illustrated on the integral molded plastic outer component, in accordance with an embodiment of the present invention.
Figure 4:
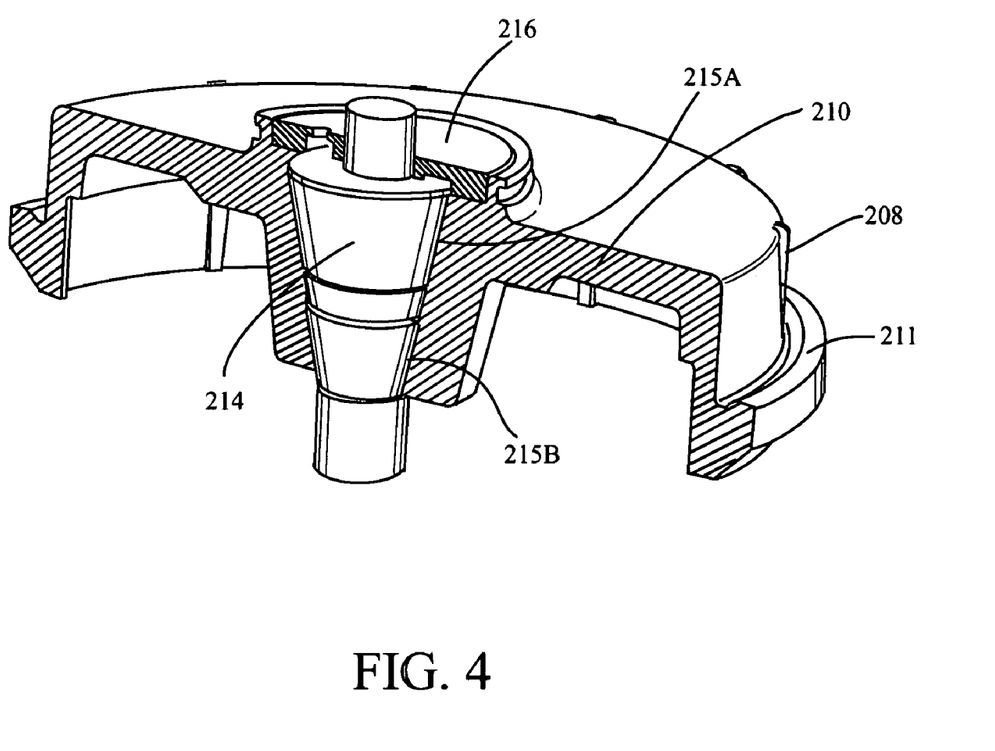
FIG. 4 is a perspective image of the fluid dynamic bearing motor as in FIG. 2A, wherein the plastic outer component defines a primary bearing and a secondary bearing with an inner component, and wherein a draft free rib is shown on an outer diameter of the outer component, in accordance with an embodiment of the present invention.

FIG. 3 illustrates a sectional side view of the FDB motor as in FIG. 2A, wherein draft is illustrated on the integral molded plastic outer component (i.e., hub 210), in accordance with an embodiment of the present invention. The inside diameter of the hub is set having an angle in the range of 15 degrees to 70 degrees with the axis 204 of shaft 212. In one embodiment, the inside diameter of the hub is set having an angle of 22 degrees with the axis 204 of shaft 212. The outside diameter of the hub 210 is set having an angle of 10 degrees with the axis 204 of shaft 212. Other surfaces of hub 210, as shown, are set having an angle of 10 degrees with the axis 204 of shaft 212. A draft-free surface 208 is intermittently situated around the outer diameter of hub 210 for the positioning of discs. The draft-free surface 208 extends parallel to the axis of rotation 204. The discs are thus situated at a perpendicular angle to the axis 204 of shaft 212. This draft-free surface 208 is also shown in FIG. 4. Additionally, in an embodiment, a parting line of the mold is situated below the radial surface of disc carrier member 211. Thus, critical features of the mold are formed on the same side of the mold, ensuring form control and dimensional control of the motor.

FIG. 4 is a perspective image of the FDB motor as in FIG. 2A, wherein the plastic outer component (i.e., hub 210) defines a primary bearing 215A and a secondary bearing 215B with shaft 214. Additionally, a molded draft free rib 208 is formed on an outer diameter of hub 210. As previously described, draft-free ribs 208 are intermittently situated around the outer diameter of hub 210 for the positioning of discs. In an embodiment, the draft free ribs 208 are formed every 30 degrees to 45 degrees about the hub 210, and are shaped small enough to avoid dragging upon mold separation.

In this motor design, the inner component shaft 214 is stationary and conical. The plastic outer component hub 210 defines a primary bearing 215A and a secondary bearing 215B with the inner component shaft 214. The primary bearing 215A is formed having a less variable gap as compared with the secondary bearing 215B. In an embodiment, the gap of the primary bearing 215A is about 6 microns, and the gap of the secondary bearing 215B is in the range of 3 microns to 9 microns. Further, the primary bearing 215A maintains greater axial and radial bearing stiffness as compared with the secondary bearing 215B. The primary bearing 215A also substantially establishes axial positioning of the outer component hub 210 with respect to the inner component shaft 214.

Figure 5A:
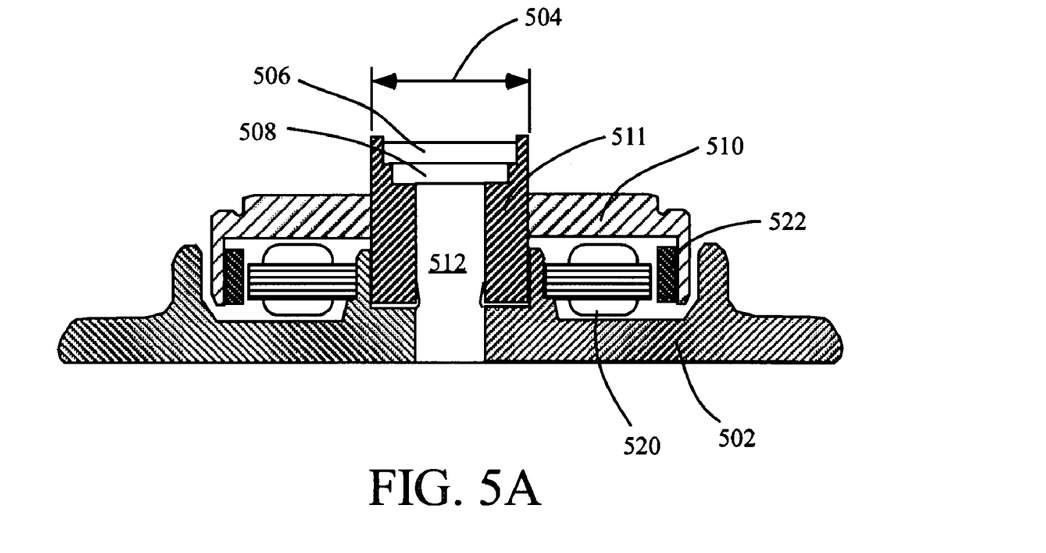
FIG. 5A is a sectional side view of a fluid dynamic bearing motor having a sleeve extending about a counterplate and a thrustplate.

FIG. 5A illustrates a sectional side view of a FDB motor having a sleeve 511 extending about a thrustplate 508 and a counterplate 506. The design of the sleeve 511 requires that the diameter 504 of the sleeve 511 exceed the diameter of the thrustplate 508 and counterplate 506, such that the shaft 512, sleeve 511, counterplate 506, and thrustplate 508 can be assembled as a single bearing unit, separate from the hub 510. The sleeve 511 is relatively expensive to machine for proper design precision. The sleeve 511 having the form shown requires precision machining, especially the surfaces of sleeve 511 facing the thrustplate 508 and a counterplate 506. The rotatable components in this motor example include counterplate 506, sleeve 511, hub 510, and magnet 522, while the stationary components include shaft 512, thrustplate 508, base plate 502, and stator 520.

Figure 5B:
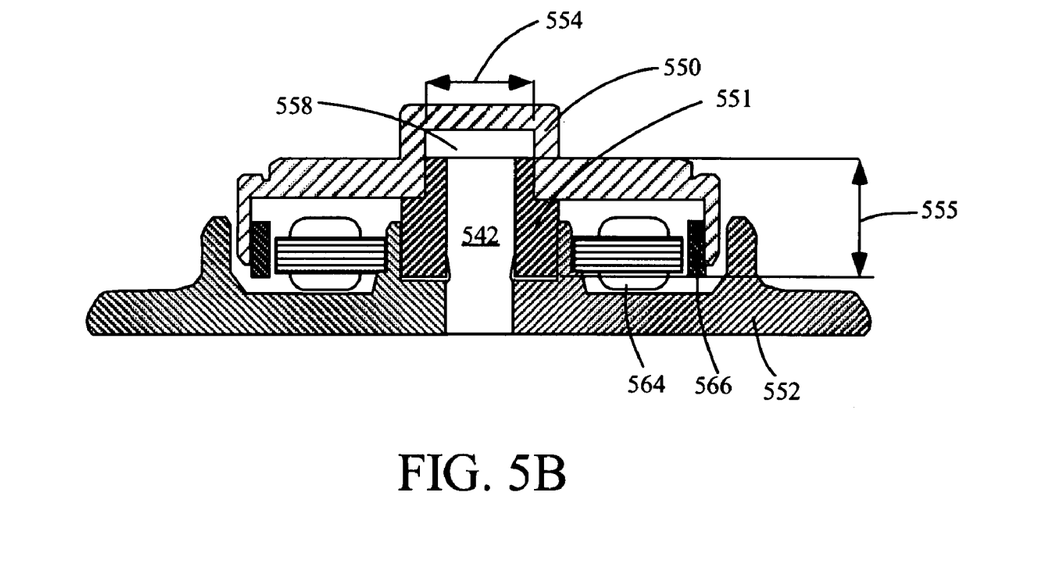
FIG. 5B is a sectional side view of a fluid dynamic bearing motor wherein the plastic outer component is a hub that has a thrustplate facing surface, in accordance with an embodiment of the present invention.

FIG. 5B is a sectional side view of a FDB motor wherein the plastic outer component is a hub 550 that has a surface facing thrustplate 558, in accordance with an embodiment of the present invention. Here, the inner component is shaft 542, which is affixed to thrustplate 558. The hub 550 is utilized to face thrustplate 558, rather than counterplate 506 as shown in FIG. 5A. The hub 550 faces the radial surface and the axial surface of the thrustplate 558. As such, the dimensions of sleeve 551 are reduced, as illustrated by the diameter 554 of the sleeve 551 and the axial height 555 of the sleeve 551. Machining costs are reduced since any machining of the plastic portions of hub 550 is less expensive as compared with machining of the sleeve 551. Further, a counterplate can be eliminated from the motor, or used in conjunction with and affixed to hub 550. The rotatable components in this motor example include sleeve 551, hub 550, and magnet 566, while the stationary components include shaft 542, thrustplate 558, base plate 552, and stator 564.

Figure 6A:
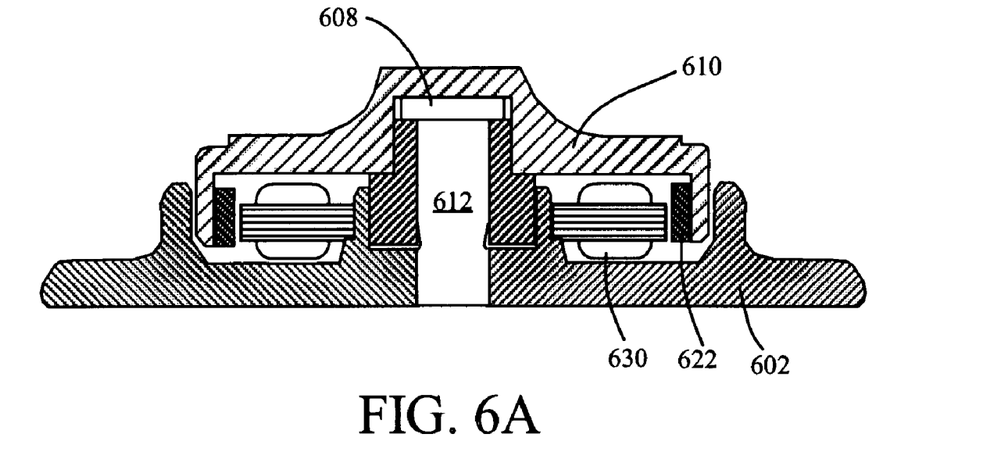
FIG. 6A is a sectional side view of a fluid dynamic bearing motor wherein the plastic outer component is a hub that has a thrustplate facing surface, wherein the thrustplate facing surface includes grooves, in accordance with an embodiment of the present invention.
Figure 6B:
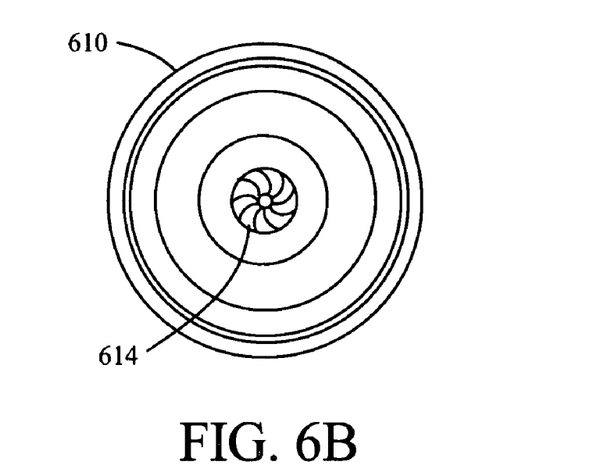
FIG. 6B is a plan view of the hub in FIG. 6A showing the grooves on the thrustplate facing surface, in accordance with an embodiment of the present invention.
Figure 6C:
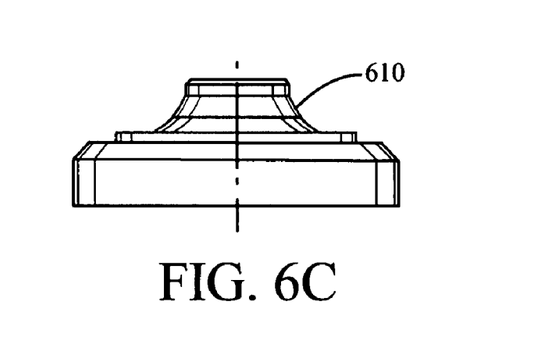
FIG. 6C is a perspective image of the hub in FIG. 6A, in accordance with an embodiment of the present invention.

As illustrated in FIG. 6A, a sectional side view of a FDB motor is shown including a shaft 612 and a base plate 602, wherein the plastic outer component is a hub 610 that has a surface facing a thrustplate 608. The thrustplate facing surface of hub 610 includes grooves 614 (shown in FIG. 6B), in accordance with an embodiment of the present invention. Grooves 614 are molded in the plastic hub 610 in the shape of spirals, herringbone or other useful form. Grooves 614 are shown in a molded spiral form in FIG. 6B. The grooves 614 induce fluid flow and generate a localized region of dynamic high pressure and axial stiffness. Grooves 614 also provide an upward force to counterbalance a downward force created by the magnetic bias force of magnet 622 with stator 630. Hub 610 is further illustrated with a perspective image in FIG. 6C.

Figure 7:
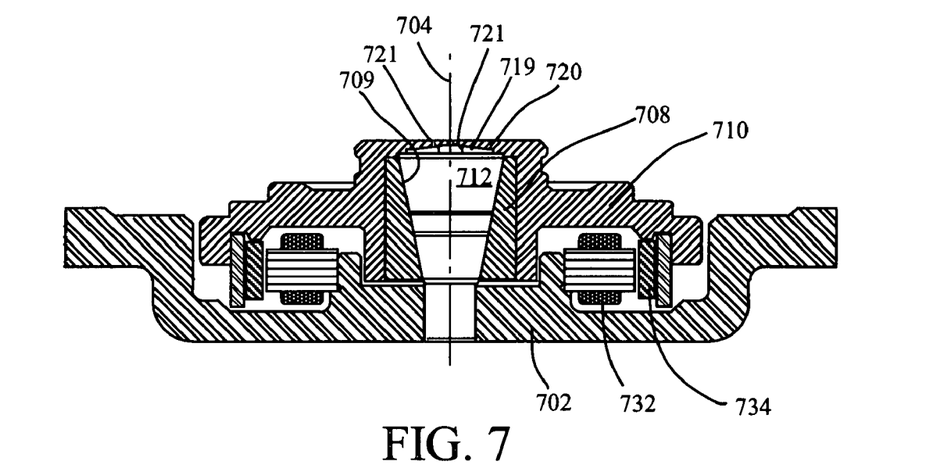
FIG. 7 is a sectional side view of a fluid dynamic bearing motor wherein a plastic outer component is affixed to a metal component wherein the metal component faces and defines a bearing with a conical inner component, and wherein the plastic outer component includes a fluid containment structure formed by the molding process, in accordance with an embodiment of the present invention.

Turning now to FIG. 7, a sectional side view of a FDB motor is illustrated wherein a plastic outer component (i.e. hub 710) is affixed to component 708. In an embodiment, component 708 is metal, and metal component 708 faces and defines a bearing 709 with a conical inner component 712. The conical inner component 712 includes an axis 704. In an alternative embodiment, component 708 is plastic and formed during the molding process with plastic hub 710. In yet an alternative embodiment, a component 708 is formed of molded plastic and the hub 710 is metal. In yet another alternative embodiment, the hub 710 faces and defines bearing 709 with the conical inner component 712, such that component 708 is not utilized.

In an embodiment, the plastic hub 710 includes a fluid containment structure 719 formed during the plastic molding process of the hub 710. The fluid containment structure 719 and an axial top of the inner component 712 define a radially extending fluid reservoir 720 therebetween. The rotating components in this motor include hub 710, component 708, and magnet 734. The stationary components include inner component 712, base plate 702 and stator 732. In an embodiment, the facing surfaces of the hub 710 and the inner component 712 form a centrifugal fluid seal 721 therebetween.

Figure 8:
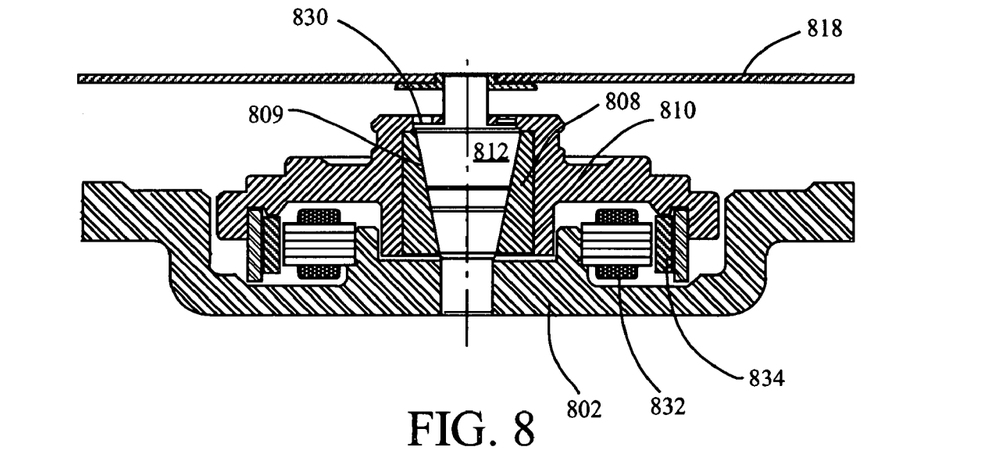
FIG. 8 is a sectional side view of a fluid dynamic bearing motor wherein a plastic outer component is affixed to a metal component wherein the metal component faces and defines a bearing with a conical inner component, and wherein the inner component attaches to a top cover, in accordance with an embodiment of the present invention.

FIG. 8 is a sectional side view of a FDB motor wherein a plastic outer component (i.e., hub 810) is affixed to component 808. In an embodiment, component 808 is metal, and metal component 808 faces and defines a bearing 809 with a conical inner component 812. In an alternative embodiment, component 808 is plastic and formed during the molding process with plastic hub 810. In yet an alternative embodiment, component 808 is formed of molded plastic and the hub 810 is metal. In yet another alternative embodiment, the hub 810 faces and defines bearing, 809 with the conical inner component 812, such that component 808 is not utilized. The rotating components in this motor include hub 810, component 808 and magnet 834. The stationary components include inner component 812, base plate 802, stator 832, and top cover 818. The inner component 812 attaches to top cover 818.

In an embodiment, the plastic hub 810 includes a fluid fill hole 830 positioned adjacent to the an axial top of the inner component 812. The fluid fill hole 830 is formed during the molding process of plastic hub 810. Alternatively, fluid fill hole 830 is formed by machining the hub 810.

Figure 9:
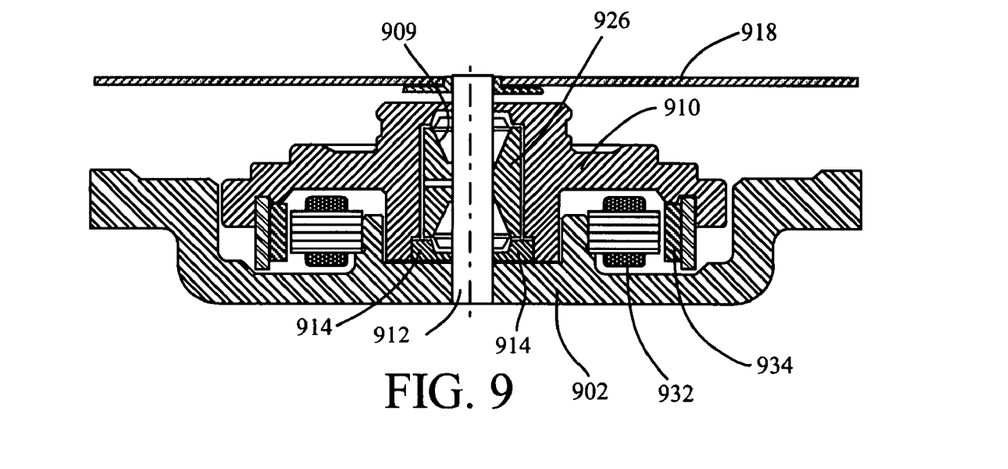
FIG. 9 is a sectional side view of a fluid dynamic bearing motor wherein a plastic outer component is affixed to a metal component wherein the metal component faces and defines a bearing with a dual conical inner component, and wherein the inner component attaches to a top cover, in accordance with an embodiment of the present invention.

FIG. 9 illustrates a sectional side view of a FDB motor wherein a plastic outer component (i.e., hub 910) is affixed to component 926. In an embodiment, component 926 is metal, and metal component 926 faces and defines a bearing 909 with dual conical inner component 912. In an alternative embodiment, component 926 is plastic and formed during the molding process with plastic hub 910. In yet an alternative embodiment, component 926 is formed of molded plastic and the hub 910 is metal. In yet another alternative embodiment, the plastic hub 910 faces and defines bearing 909 with the dual conical inner component 912, such that component 926 is not utilized. The rotating components in this motor include hub 910, component 926, and magnet 934. The stationary components include dual conical inner component 912, base plate 902, stator 932, and top cover 918. The dual conical inner component 912 attaches to top cover 918. Additionally, a fluid shield 914 is affixed to hub 910 to contain fluid within bearing 909 using a centrifugal fluid seal. Fluid shield 914 can be formed of plastic along with the molding process of plastic hub 910. Alternatively, fluid shield 914 may be bonded to hub 910.

In an alternative embodiment, at least one of an integral plastic hub, a plastic hub affixed to a metal sleeve, or a shaft is shaped as a single cone, a dual cone, a spherical form, or as a hemispherical form. In yet an alternative embodiment, the facing surfaces of an integral plastic hub and a shaft that form a fluid bearing therebetween (or the facing surfaces of a metal sleeve affixed to a plastic hub and the shaft that form a fluid bearing therebetween) are shaped having a flat surface.

FIG. 10 is a sectional side view of a FDB motor wherein a plastic outer component (i.e., plastic hub 958) faces and defines bearings 976A and 976B with respective inner components cones 956 and cone supports 954. The inner components include shaft 952, cone supports 954, and cones 956. Cone supports 954 are affixed to the shaft 952, and cones 956 are affixed to the cone supports 954. In an embodiment of the present invention, cone supports 954 are cones 956 are formed of molded plastic along with plastic hub 958. The cone supports 954 and the cones 956 define a fluid passageway 974 therebetween. Additionally, shaft 952 is attached to a top cover 964.

A fluid shield 960 is affixed to hub 958 to contain fluid within reservoir 972 using a centrifugal fluid seal. As fluid circulates through fluid passageway 974 and through bearings 976A and 976B, air is forced toward reservoir 972 and purged from the FDB motor. Further, air vents 962 are structured to provide an air passageway between the inner diameter of cone supports 954 and the outer diameter of shaft 952. In an embodiment, air vents 962 extend the entire length of the cone support 954, and allow the plenum 968 to communicate with air outside the FDB motor.

Modifications and variations may be made to the disclosed embodiments while remaining within the spirit and scope of the invention. The implementations described above and other implementations are within the scope of the following claims.

We claim:

1. A motor comprising:
   an inner component; and
   an outer component including a portion made of plastic, wherein
   said inner and outer components are positioned for relative rotation,
   said inner and outer components are further positioned to define a fluid dynamic bearing therebetween, and
   said portion of said outer component includes a fluid recirculation pathway operable to recirculate a fluid about the fluid dynamic bearing.

2. The motor of claim 1, wherein said inner component is a shaft, and wherein said outer component includes a hub.

3. The motor of claim 2, wherein said outer component further includes a sleeve.

4. The motor of claim 1, wherein said inner component is affixed to a top cover.

5. The motor of claim 1, wherein said outer component includes a rib extending from an outer diameter of said outer component, and wherein said rib is operable to position a storage disc.

6. The motor of claim 1, wherein said inner and outer components are further positioned to form a fluid reservoir.

7. The motor of claim 1, wherein a surface of said portion includes at least one groove.

8. The motor of claim 1, wherein said inner component includes a shape selected from a group consisting of a flat surface, a single cone, a dual cone, a spherical form and a hemispherical form.

9. The motor of claim 1, wherein said plastic is a liquid crystal polymer including a carbon fiber filling.

10. The motor of claim 1 further comprising:
    a backiron affixed to said outer component; and
    a magnet attached to said backiron, and
    wherein said backiron extends adjacent to at least two sides of said magnet.

11. The motor of claim 1, wherein said inner portion is conical, wherein said inner and outer components are further positioned to define another fluid dynamic bearing, and wherein a gap of said fluid dynamic bearing is less variable than a gap of said another fluid dynamic bearing.

12. The motor of claim 1, wherein said inner component includes a fluid recirculation pathway operable to recirculate a fluid about the fluid dynamic bearing.

13. The motor of claim 1, wherein said outer component further includes another portion made of metal.

14. A motor comprising:
    an inner component; and
    an outer component including a first portion and a second portion, wherein said first portion is made of plastic, wherein
    said inner and outer components are positioned for relative rotation,
    said inner and outer components are further positioned to define a fluid dynamic bearing, and
    said first portion of said outer component includes a fluid recirculation pathway operable to recirculate a fluid about the fluid dynamic bearing.

15. The motor of claim 14, wherein said inner component is a shaft, wherein said first portion is a hub, and wherein said second portion is a sleeve.

16. The motor of claim 14, wherein said inner component is affixed to a top cover.

17. The motor of claim 14, wherein said outer component includes a rib extending from an outer diameter of said outer component, and wherein said rib is operable to position a storage disc.

18. The motor of claim 14, wherein said inner and outer components are further positioned to form a fluid reservoir.

19. The motor of claim 14, wherein a surface of said first portion includes at least one groove.

20. The motor of claim 14, wherein said inner component includes a shape selected from a group consisting of a flat surface, a single cone, a dual cone, a spherical form and a hemispherical form.

21. The motor of claim 14, wherein said plastic is a liquid crystal polymer including a carbon fiber filling.

22. The motor of claim 14 further comprising:
    a backiron affixed to said outer component; and
    a magnet attached to said backiron, and
    wherein said backiron extends adjacent to at least two sides of said magnet.

23. The motor of claim 14, wherein said inner portion is conical, wherein said inner and outer components are further positioned to define another fluid dynamic bearing, and wherein a gap of said fluid dynamic bearing is less variable than a gap of said another fluid dynamic bearing.

24. The motor of claim 14, wherein said inner component includes a fluid recirculation pathway operable to recirculate a fluid about the fluid dynamic bearing.

25. The motor of claim 14, wherein said second portion of said outer component is made of metal.

\* \* \* \* \*